Jan. 8, 1957  N. H. MEYER ET AL  2,776,763
VEHICLE MOUNTED HYDRAULIC BALE LOADER
Filed Feb. 1, 1954  3 Sheets-Sheet 1

INVENTORS
NORBERT H. MEYER
ORMAND F. MEYER
BY
Arthur H. Sturges
ATTORNEY

INVENTORS
NORBERT H. MEYER
ORMAND F. MEYER
BY
Arthur H. Sturges
ATTORNEY

Jan. 8, 1957   N. H. MEYER ET AL   2,776,763
VEHICLE MOUNTED HYDRAULIC BALE LOADER
Filed Feb. 1, 1954   3 Sheets-Sheet 3

INVENTORS
NORBERT H. MEYER
ORMAND F. MEYER
BY
Arthur H. Sturges
ATTORNEY

United States Patent Office 2,776,763
Patented Jan. 8, 1957

2,776,763

VEHICLE MOUNTED HYDRAULIC BALE LOADER

Norbert H. Meyer and Ormand F. Meyer, West Point, Nebr., assignors of one-fifth to Marlon B. Meyer and one-fifth to Ewald I. Meyer, both of West Point, Nebr., and two-fifths to said Norbert H. Meyer, and one-fifth to said Ormand F. Meyer Application February 1, 1954, Serial No. 407,242

7 Claims. (Cl. 214—83.26)

This invention relates to farm implements used primarily for picking up bales of hay in the field and storing and stacking the bales, and in particular a one man machine wherein an operator positioned on the seat of a truck or in the cab of a trailer may manipulate gathering elements to position bales of hay whereby the bales are adapted to be conveyed to positions over a truck body or trailer and kicked from the conveying means into positions in compact layers in the truck body or trailer; and wherein by the same means the bales of hay may be removed from the truck or trailer and deposited in a barn, or on a mow or stack.

The purpose of this invention is to provide a complete hay bale handling device with which one man, while seated in a cab of a truck or the like, may pick up bales of hay in a field and deposit the bales in a mow or stack.

One of the most important factors in the cost of harvesting hay is the man hours required to pick up the hay in the field and unload the bales of hay at the mow or stack. Bales of hay are comparatively heavy and it usually requires several men to load the bales on a truck and to remove the bales from the truck. In the past when one farmer helped another this was not such a problem, however, where all farm help is skilled the cost of using three men to recover bales of hay adds a substantial sum to the cost of the hay.

With this thought in mind this invention contemplates a series of flexibly connected conveyor sections adapted to extend over the cab of a truck with the leading end of the forward section which is inclined extended to the ground and provided with means for positioning and picking up bales of hay, with a distributing section of the conveyor extended over the body of the truck provided with means for kicking the bales from the conveyor into the truck, and with an intermediate conveyor section connecting the inclined and distributing sections, and with the sections of the conveyor adjusted and operated by hydraulic jacks or cylinders which are controlled by valves the levers or handles of which are positioned in the cab of the vehicle.

The object of this invention is, therefore, to provide a sectional conveyor adapted to be installed on a truck whereby an operator seated in a cab of the truck may pick up bales of hay in a field and deposit the bales in the body of the truck.

Another object of the invention is to provide elevating and conveying elements adapted to be installed on a motor vehicle, such as a truck, with which one man may pick up, transport, and stack bales of hay with the same equipment.

Another important object of the invention is to provide means whereby an operator may pick up bales of hay in a field and deposit the bales in the body of a truck in which means is provided for depositing the bales in compact layers in the body of the truck so that more bales may be carried in each trip to the field and whereby the number of trips to the field are reduced to a minimum.

A further object of the invention is to provide a sectional conveyor adapted to be installed on a truck and adapted to pick up and stack bales of hay in which means is provided for reversing the conveying elements.

A still further object is to provide a sectional conveyor for picking up bales of hay in a field which is adapted to be installed on a truck in which means is provided for positioning the bales as they are removed from the ground so that they may be conveniently handled by the conveying elements.

And a still further object is to provide a series of elevators and conveyors adapted to be mounted on a truck with which bales of hay may be picked up from a field, transported, and stacked in which the device is of a simple and economical construction.

With these and other objects and advantages in view the invention embodies an inclined conveyor having hay bale positioning and picking up elements on the lower end, a distributing conveyor section positioned over the body of a truck upon which the device is mounted and provided with kickers for removing the bales from the conveyor, an intermediate connecting conveyor section pivotally connected to the inclined conveyor at one end and to the distributig conveyor at the opposite end, and suitable hydraulic cylinders and operating elements with manually actuated control valves in combination therewith for adjusting the positions of the conveying elements and for operating parts thereof.

Other features and advantages of the invention will appear from the following description taken in connection with the drawings, wherein:

Figure 1A is a side elevational view with the parts shown on an enlarged scale illustrating the hay bale positioning and picking up elements extended forwardly from the leading end of the inclined conveyor.

Figure 1:
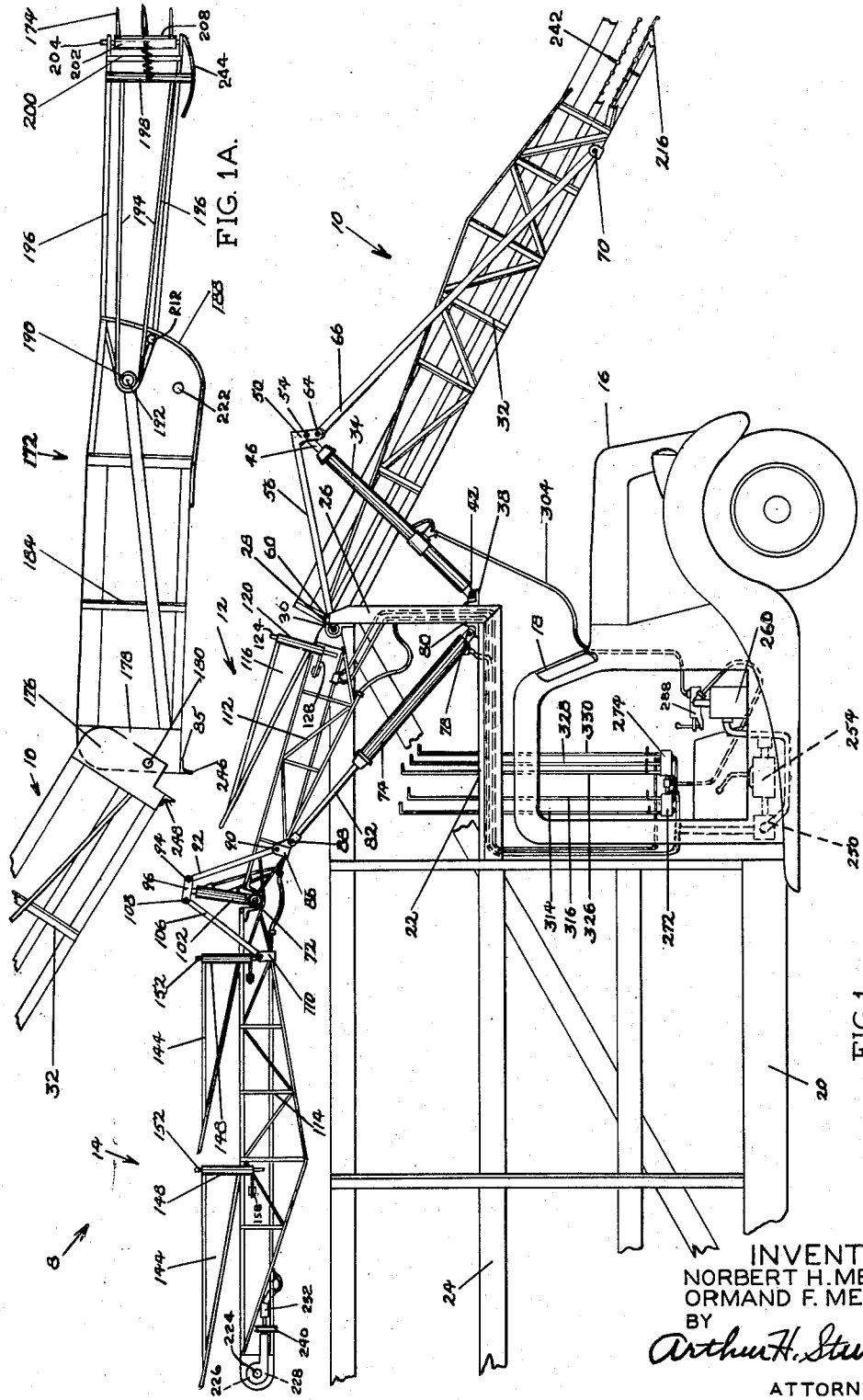
Figure 1 is a side elevational view showing the forward part of a truck with the hay bale conveyors installed thereon with the rear portion of the truck and the forward end of an inclined conveyor positioned thereon broken away.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 8 refers to the invention in its entirety, numeral 10 indicating an inclined conveyor section, numeral 12, an intermediate or connecting section, and numeral 14 a distributing conveyor section.

In the design shown the hay bale picking up and handling elements are installed on a truck 16 having a cab 18 and a body or platform 20 and the parts are supported by a platform 22 forming part of the truck body framework 24.

The forward end of the platform 22 is provided with a vertically disposed frame 26 on which the conveyor sections are supported and, as shown in Figure 1, the sections 10 and 12 are pivotally mounted on a shaft 28 that is mounted in bearings 30 on the upper edge of the frame 26. The inclined conveyor section 10, which is provided with truss formations 32 at the sides, is supported by hydraulic cylinders 34 and 36 which are pivotally mounted with angle irons 38 on the lower edge of the frame 26 with pins 42 and 44. Piston rods 46 and 48 extended from the cylinders 34 and 36, respectively, are connected to links 50 and 52 with pins 54, the upper ends of the links being connected to rods 56 and 58, which are rearwardly extended and secured to the frame 26 as at the point 60, and the lower ends of which are pivotally connected by pins 64 to braces 66 and 68 which are pivotally connected to the trusses of the section 10 by pins 70. By this means the lower end of the conveyor section 10 is moved upwardly as the piston rods are forced upwardly from the upper ends of the cylinders.

The intermediate conveyor section 12 is pivotally connected to the distributing conveyor section 14 with a shaft 72 and the positions of the sections are adjusted by hydraulic cylinders 74 and 76 which are pivotally mounted by pins 78 on angle irons 80 in the lower corner of the frame 26, piston rods 82 and 84 of the cylinders being connected to triangular-shaped lever assemblies between the sections 12 and 14 through gusset plates 86 to which they are connected with pins 88. The gusset plates are pivotally connected by pins 90 to links 92 and the upper ends of the links are pivotally connected by pins 94 to plates 96 on the upper ends of piston rods 98 and 100 which extend from cylinders 102 and 104 that are pivotally mounted on the shaft 72. The opposite ends of the plates 96 are pivotally connected to links 106 with pins 108 and the opposite ends of the links 106 are pivotally connected to gusset plates 110 on the sides of the conveyor section 14.

Fluid under pressure supplied to the cylinders 102 and 104 adjusts the angular relation between the sections 12 and 14 whereby the distributing section of the conveyor may be moved upwardly with layers of bales in the body of the truck, and this assembly in combination with the cylinders 74 and 76 makes it possible to readily adjust the elevation of the entire rear portion of the conveyor.

The conveyor elements of the intermediate section 12 are supported by side trusses 112 and similar trusses 114 are provided at the sides of the distributing section 14.

The intermediate and distributing sections of the conveyor are provided with shunt arms, which are triangular-shaped in elevation, and which are adapted to kick bales of hay from the conveyor so that the bales may drop into positions in the body of the truck or the like.

Figure 2:
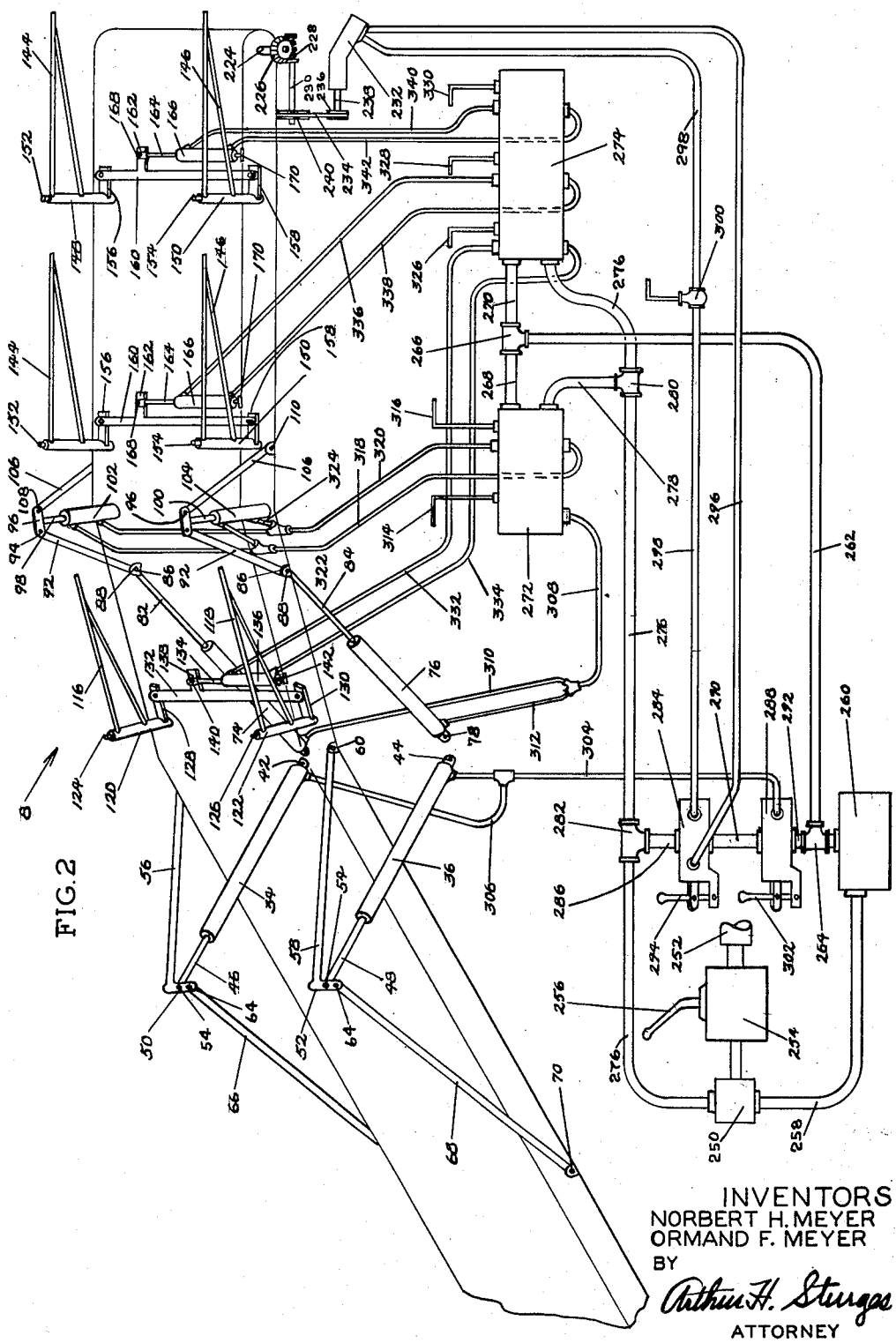
Figure 2 is a diagrammatic view looking toward the side of the apparatus opposite to that shown in Figure 1 showing the hydraulic cylinders and elements with the fluid supply pump and control valves for adjusting the positions of and also for operating the parts of the conveying elements.

The shunt arms of the intermediate section 12, which are indicated by the numerals 116 and 118, are provided with cylindrical hubs 120 and 122, and the hubs are pivotally mounted on vertically disposed shafts 124 and 126, respectively. The lower ends of the hubs are provided with arms 128 and 130, the extended ends of which are pivotally connected to a bar 132 which is connected to a piston rod 134 of a cylinder 136, as shown in Figure 2. The bar is provided with an extension 138 that is pivotally connected to the piston rod with a pin 140, and the end of the cylinder opposite to that from which the piston rod extends is secured to the side truss or frame of the conveyor section, as indicated at the point 142.

The distributing conveyor section 14 is provided with a plurality of pairs of shunt arms, each pair including arms 144 and 146 which extend from hubs 148 and 150 and the hubs are mounted on vertically disposed shafts 152 and 154, respectively. The lower ends of the hub 148 and 150 are provided with arms 156 and 158 which are pivotally connected to a bar 160, and the bar is provided with an extension 162 to which a piston rod 164 of a cylinder 166 is connected with a pin 168. The opposite ends 170 of the cylinders of the shunt arms 144 and 146 are mounted on the trusses or frames of the distributing conveyor.

The lower and forward end of the inclined conveyor section 10 is provided with a nose section, as generally indicated by the numeral 172, and the extended end of the section 172 is provided with prongs 174 for positioning bales of hay to facilitate picking up the bales with the said nose section.

Figure 3:
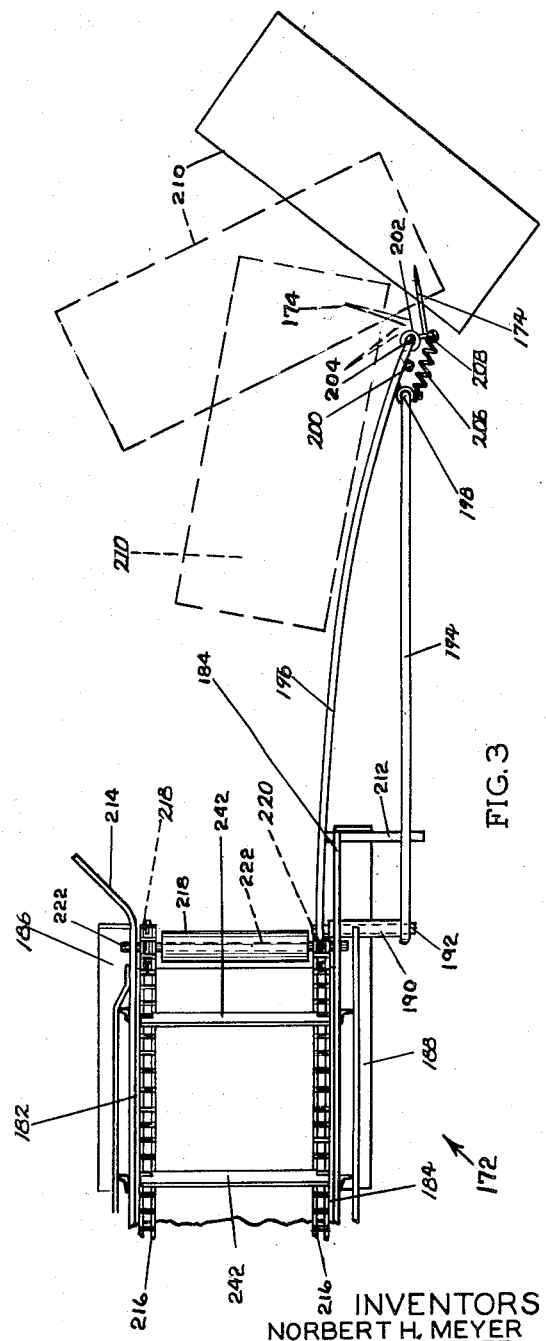
Figure 3 is a plan view of the hay bale positioning and picking up elements shown in Figure 1A, showing a bale of hay in full lines as it may be positioned in a field and in adjusted positions in broken lines.

The end of the section 10 is provided with side or end plates 176 that are secured to the ends of the trusses, and the section 172 is provided with similar plates 178 which are pivotally connected to the plates 176 with a shaft 180. The plates 178 are secured on the ends of trusses 182 and 184 forming the sides of the section 172 and the forward ends of the sides are supported on skid runners 186 and 188. The truss 184 is provided with an outwardly extended tubular arm 190 and a shaft 192 provides a pivotal mounting for forwardly extended struts 194 and 196. The forward ends of the struts 194 are secured to a post 198 and the forward ends of the struts 196 are similarly connected to a post 200, as shown in Figures 1A and 3. A hub 202, from which the prongs 174 extend is pivotally mounted between the strut 194 and 196 with a vertically disposed shaft 204, and, as shown in Figure 3, the prongs are retained in an outwardly extended position by a spring 206, one end of which is connected to the post 198 and the other to a tab 208 extended outwardly from the hub 202. As illustrated in Figure 3, as the prongs strike a bale of hay, with the bale in the position shown in full lines, the forward travel of the prongs will swing the bale around, following the dotted line positions until the bale arrives at the position indicated by the broken lines 210, in which position it is readily picked up by the flights of the conveyor. The struts 194 and 196 are limited from swinging downwardly by a stop bar 212 welded transversally across the forward end of the truss 184 and positioned beneath the struts 194 and 196.

The forward end of the nose section 172 is provided with an outwardly flared guide 214 which extends from the truss 182 to guide the bales into the leading end of the conveyor.

The conveyor is provided with endless chains, as indicated by the numeral 216, that are trained over sprockets, as indicated by the broken lines 218 and 220, on a tail shaft 222 with a roller 223 at one end of the conveyor, and over similar sprockets on a head shaft 224 at the opposite or driving end of the conveyor. An extended end of the shaft 224 is provided with a worm gear 226 that meshes with a worm 228 on a shaft 230 and, as illustrated in Figure 2, the shaft 230 is driven by a hydraulic motor 232 by a belt 234 which is trained over a pulley 236 on the motor shaft 238 and a pulley 240 on the shaft 230. It will be understood that the conveyor may be driven by other suitable means.

The endless chains 216 are provided with transversely disposed flights 242 which carry the bales of hay over the rails of the conveyor.

The lower portion of the extended prong carrying end of the nose section 172 is provided with an arcuate shoe 244 which spaces the prongs from the ground, and, as shown in Figure 1A the lower edges of the plates 178 are provided with transversely disposed angle irons 246 which are positioned to engage a transversely positioned angle iron 248 on the lower edges of the plates 176. By this means the nose section 172 may be retained in an upwardly disposed position as the section 10 is elevated.

Fluid, such as oil, is supplied under pressure by a pump 250 which is actuated by the power take-off 252 of the engine of the truck through a transmission 254, and the transmission is provided with a selecting or speed changing lever 256. The suction side of the pump is connected by a tube 258 to a reservoir 260 and the reservoir is connected to a return connection 262 through a fitting 264, the return connection extending from a T 266 which is connected by nipples 268 and 270 to control valves 272 and 274. The control valves are connected to the discharge or pressure side of the pump with a tube 276 which extends directly to the valve 274, and which is connected to the valve 272 by a tube 278 which extends from a T 280.

The fluid pressure tube 276 is also provided with a T 282 which forms a connection for a control valve 284 through which fluid is supplied to the fluid motor 232. The valve 284 is connected to the T 282 with a nipple 286, and the opposite side of the valve is connected to a valve 288 by a nipple 290. The opposite side of the valve 288 is connected to the fitting 264 of the return connection 262 with a nipple 292. The valve 284 is provided with an operating lever 294 by which the valve may be set to a neutral position whereby fluid may pass through the valve to the valve 288, and with the lever set in one position fluid is supplied to the motor 232 through a tube 296 whereby the conveyor is driven in one direction, and with the lever set in the opposite position fluid is supplied through the tube 298 whereby the motor is actuated to drive the conveyor in the opposite direction. The tube 298 is provided with a shut-off valve, or cock 300, which is positioned in the cab of the truck, and with this valve the operator may regulate the flow of fluid to the motor 232, or shut-off the fluid and thereby stop the motor, as desired.

The valve 288 is provided with a similar lever 302 and with the lever in a neutral position fluid may flow from the valve 284 to the fitting 264 and reservoir 260. With the lever 302 fluid is supplied to the cylinders 34 and 36 through tubes 304 and 306 whereby the inclined section 10 of the conveyor is elevated. Upon release of the fluid the section is returned by gravity and, consequently, the lower end of the section 10 is readily adjusted to facilitate picking up bales of hay.

The cylinders 74 and 76, which control the positions of the intermediate and distributing sections of the conveyor, are connected to the control valve 272 with a tube 308 from which branch connections 310 and 312 extend and this portion of the valve is actuated by a hand lever 314. The triangular-shaped lever assemblies are actuated by a hand lever 316 which controls the flow of fluid to the cylinders 102 and 104, the cylinders being connected to the valve 272 with tubes 318 and 320 and connecting tubes 322 and 324.

The valve 274 controls the actions of the shunt arms and the sections of the valve are actuated by levers 326, 328, and 330 to kick bales of hay from either side of the conveyor, and with the levers positioned in the cab of the truck, or extended to the platform 22 above the cab of the truck, an operator may readily throw the bales to desired positions whereby the bales may be deposited in compact layers in the body of the truck.

As illustrated in Figure 2, the section of the valve 274 controlled by the lever 326 is connected by tubes 332 and 334 to opposite ends of the cylinder 136 whereby the shunt arms 116 and 118 are actuated to throw bales of hay to either side of the intermediate section 12 of the conveyor. In the same manner the section of the valve 274 that is controlled by the lever 328 is connected by tubes 336 and 338 to opposite ends of the cylinder 166, and the section of the valve controlled by the lever 330 is connected by tubes 340 and 342 to the opposite ends of the cylinder 166 spaced from the former cylinder 166. It will be understood that as many of the cylinders 166 and shunt arm assemblies associated therewith may be used as may be desired. By this means bales of hay may be kicked to the right or left of the conveyor or deposited in the center of the truck body, as may be desired.

The hydraulic hay bale loading and unloading device of this invention may, therefore, be installed on a truck body and bales of hay may be positioned, picked up, loaded into the truck body, and conveyed from the truck body to a stack or mow by an operator positioned on a seat in the cab of the truck or on a platform above the cab, whereby the bales may be picked up from the field, transported to a barn or the like, and stacked or stored by a single operator.

The hydraulic cylinders provide means for independently operating each section of the conveyor to facilitate loading bales of hay or the like on the truck and conveying the bales from the truck to a mow or stack, and with the positive controls of the different parts the bales may be compactly placed in the layers in the truck body, so that the trips to and from the field to the mow or stack or from the mow or stack to the field may be reduced to a minimum.

From the foregoing specification it will become apparent that the invention disclosed will adequately accomplish the functions for which it has been designed and in an economical manner, and that its simplicity, accuracy, and ease of operation, are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. A hay bale conveying attachment comprising a sectional conveyor including an inclined section, a distributing section, and an intermediate section positioned between the distributing section and the inclined section, means pivotally mounting the trailing end of the inclined section and leading end of the intermediate section on a vehicle, triangles of levers on the sides of the conveyor pivotally connecting the intermediate section to the distributing section, hydraulic cylinders pivotally connected to lower forward corners of the triangles of levers for adjusting the positions of the conveyor sections, hydraulic jacks in the triangles of levers for additionally adjusting the position of the distributing section of the conveyor in relation to the intermediate section, bale pick up means on the extended end of the inclined section, bale removing means on the distributing section, and operating means for adjusting the inclined section of the conveyor and for actuating the conveyor.

2. A hay bale conveying attachment comprising a sectional conveyor including an inclined section, a distributing section, and an intermediate section positioned between the distributing section and the inclined section, means pivotally mounting the trailing end of the inclined section and leading end of the intermediate section on a vehicle, triangles of levers on the sides of the conveyor pivotally connecting the intermediate section to the distributing section, hydraulic cylinders pivotally connected to lower forward corners of the triangles of levers for adjusting the positions of the conveyor sections, hydraulic jacks in the triangles of levers for additionally adjusting the position of the distributing section of the conveyor in relation to the intermediate section, bale pick up means on the extended end of the inclined section, bale positioning means also on the extended end of the inclined section and positioned to coact with the pick up means, bale removing means on the distributing section of the conveyor, and means for adjusting the positions of the inclined section of the conveyor and for operating the conveyor.

3. A hay bale conveying attachment for use on a truck, said attachment comprising a sectional conveyor including an inclined section, a distributing section, and an intermediate section positioned between the distributing section and the inclined section, means pivotally mounting the trailing end of the inclined section and leading end of the intermediate section on a vehicle, triangles of levers on the sides of the conveyor pivotally connecting the intermediate section to the distributing section, hydraulic cylinders pivotally connected to lower forward corners of the triangles of levers for adjusting the positions of the conveyor sections, hydraulic jacks in the triangles of levers for additionally adjusting the position of the distributing section of the conveyor in relation to the intermediate section, bale positioning prongs pivotally mounted on the extended end of the inclined section of the conveyor, means for picking up bales of hay also pivotally mounted on the extended end of the inclined section, and hydraulic means for adjusting the positions of the inclined section of the conveyor and for operating the conveyor.

4. A hay bale loading and unloading sectional conveyor for use on a truck, said conveyor comprising an inclined section, a pick up section extended forwardly from said inclined section, a distributing section, and an intermediate section connecting the distributing section to the inclined section, bale positioning elements carried by and extended forwardly from the pick up section, means for returning the bale positioning elements to forwardly extended positions, swinging elements pivotally mounted on the sides of the intermediate and distributing sections of the conveyor for kicking bales from the conveyor, hydraulic elements for adjusting the positions of the sections of the conveyor, for operating the conveyor, and for actuating the kicking elements, means for supplying fluid under pressure to said hydraulic elements, a plurality of control valve assemblies having supply and return connections extended to said hydraulic elements, and a plurality of control levers extended from said control valve assemblies for independently actuating said conveyor sections and bale kicking elements from a common point.

5. In a loading and unloading conveyor for use on a truck, the combination which comprises an inclined conveying section, a nose section providing pick up means extended forwardly from said inclined section, a distributing section extended rearwardly from said inclined section, an intermediate section connecting the distributing section to the inclined section, triangular-shaped lever assemblies positioned to coact with the connections between the distributing section and intermediate section, a supporting platform, hydraulic cylinders mounted on said platforms and operatively connected to said conveyor sections, hydraulic cylinders connected in said lever assemblies, shunt arms pivotally mounted on sections of the conveyor for kicking products from the conveyor, hydraulic cylinders for actuating the shunt arms, a hydraulic motor for actuating the conveyor, means for supplying fluid under pressure to the hydraulic elements, and means adapted to be positioned in a cab of a truck on which the conveyor is mounted for controlling the fluid under pressure to the hydraulic elements.

6. A bale loader comprising a sectional conveyor, means for mounting the conveyor on a body of a truck with the conveyor positioned above and on the longitudinal axis of the truck, means for elevating and lowering the end of the conveyor extended from the forward end of the truck, struts mounted on one side of the conveyor and extended forwardly from the forward end thereof, hay bale gripping elements pivotally mounted on the extended ends of the struts, resilient means for actuating the gripping elements to forwardly extended positions, hydraulic cylinders for actuating sections of the conveor, and hydraulically actuated shunt arms for removing bales of hay from the conveyor.

7. A bale loader comprising a sectional conveyor, means for mounting the conveyor on a body of a truck with the conveyor positioned above the body of the truck, hydraulic cylinders for elevating and lowering the forward end of the conveyor, hydraulic cylinders for actuating sections of the conveyor to correspond with elevations of stacks of bales in a truck body, shunt arms pivotally mounted on sides of the conveyor sections and positioned to kick bales from both sides of the sections into the truck body, struts mounted on one side of the conveyor and extended from the forward end thereof, prongs pivotally mounted on extended ends of the struts and positioned to penetrate bales of hay and guide the bales into the path of the conveyor, and springs mounted on the struts and prongs for returning the prongs to forwardly extended positions.

References Cited in the file of this patent

UNITED STATES PATENTS

| | | |
|---|---|---|
| 1,270,501 | Dohm | June 25, 1918 |
| 2,409,143 | McElhinney et al. | Oct. 8, 1946 |
| 2,442,267 | Eksergian | May 25, 1948 |
| 2,503,522 | Struthers et al. | Apr. 11, 1950 |
| 2,530,496 | Watson | Nov. 21, 1950 |
| 2,531,070 | McDermott | Nov. 21, 1950 |
| 2,605,915 | Day | Aug. 5, 1952 |
| 2,615,586 | Miller et al. | Oct. 28, 1952 |
| 2,653,721 | Cantrell | Sept. 29, 1953 |
| 2,675,116 | Collins | Apr. 13, 1954 |

FOREIGN PATENTS

| | | |
|---|---|---|
| 137,769 | Australia | June 28, 1950 |
| 479,168 | Canada | Dec. 11, 1951 |